United States Patent [19]
Oenbrink et al.

[11] Patent Number: 5,637,408
[45] Date of Patent: Jun. 10, 1997

[54] THERMOPLASTIC MULTILAYER COMPOSITE HAVING A GOOD ADHESION BETWEEN LAYERS

[75] Inventors: Georg Oenbrink, Dülmen; Stefan Röber, Hamburg; Michael Meier-Kaiser, Pfungstadt, all of Germany

[73] Assignee: Huels Aktiengesellschaft, Marl, Germany

[21] Appl. No.: 463,561

[22] Filed: Jun. 5, 1995

[30] Foreign Application Priority Data

Aug. 11, 1994 [DE] Germany .................. 44 28 414.4

[51] Int. Cl.$^6$ .................................................. B32B 27/06
[52] U.S. Cl. ........................ 428/474.7; 428/476.9; 428/522
[58] Field of Search .............. 428/474.4, 476.9, 428/474.7, 522

[56] References Cited

U.S. PATENT DOCUMENTS

| | | | |
|---|---|---|---|
| 4,415,706 | 11/1983 | Staas | 525/183 |
| 4,559,266 | 12/1985 | Misasa et al. | 428/341 |
| 5,089,335 | 2/1992 | Patton et al. | 428/341 |
| 5,258,213 | 11/1993 | Muegge et al. | 428/36.91 |
| 5,313,987 | 5/1994 | Roeber et al. | 138/137 |
| 5,362,529 | 11/1994 | Muegge et al. | 428/35.7 |
| 5,362,570 | 11/1994 | Roeber et al. | 428/475.5 |
| 5,389,410 | 2/1995 | Muegge et al. | 428/34.1 |
| 5,404,915 | 4/1995 | Muegge et al. | 138/137 |
| 5,425,817 | 6/1995 | Muegge et al. | 138/137 |
| 5,449,024 | 9/1995 | Roeber et al. | 138/137 |
| 5,472,784 | 12/1995 | Roeber et al. | 428/421 |
| 5,474,822 | 12/1995 | Roeber et al. | 428/36.91 |
| 5,478,620 | 12/1995 | Muegge et al. | 428/36.91 |
| 5,500,263 | 3/1996 | Roeber et al. | 428/36.6 |
| 5,510,160 | 4/1996 | Jadamus et al. | 428/36.91 |
| 5,512,342 | 4/1996 | Roeber et al. | 428/36.91 |
| 5,529,821 | 6/1996 | Ishikawa et al. | 428/36.91 |

FOREIGN PATENT DOCUMENTS

| | | |
|---|---|---|
| 0404346 | 12/1990 | European Pat. Off. . |
| 0464561 | 1/1992 | European Pat. Off. . |
| 0637511 | 2/1995 | European Pat. Off. . |
| 0649738 | 4/1995 | European Pat. Off. . |
| 0649739 | 4/1995 | European Pat. Off. . |
| 0650004 | 4/1995 | European Pat. Off. . |
| 0673762 | 9/1995 | European Pat. Off. . |

*Primary Examiner*—Mark D. Sweet
*Attorney, Agent, or Firm*—Oblon, Spivak, McClelland, Maier & Neustadt, P.C.

[57] ABSTRACT

The invention provides a thermoplastic multilayer composite comprising at least one layer of polyamide and at least one layer of polyalkyl (meth)acrylate, bonded via at least one coupling agent interdisposed between the layers such that they adhere to one another. The composites obtained have excellent resistance to chemicals and solvents.

18 Claims, No Drawings

THERMOPLASTIC MULTILAYER COMPOSITE HAVING A GOOD ADHESION BETWEEN LAYERS

BACKGROUND OF THE INVENTION

1. Field of the Invention

The invention relates to thermoplastic multilayer composites comprising polyamides and polyalkyl (meth) acrylates. The composites have good adhesion between layers.

2. Discussion of the Background

Injection-molded and extruded shaped parts or large-area semi-finished parts such as sheets or profiles made of polyalkyl acrylate or polyalkyl methacrylate (e.g. polymethyl methacrylate (PMMA)) are conventionally used in the production of protective shields for machines, sound—protection walls, coverings for advertizing placards, in bus stops and telephone boxes, in lamp coverings and light domes and many other applications. These composites are used because of their transparency and the good optical properties of the polyalkyl (meth)acrylates, inter alia, the good mechanical property profile, the excellent UV and weathering resistance and also the good processibility of these materials by all customary processing methods.

However, owing to the unsatisfactory chemical resistance and pronounced stress-cracking sensitivity of the polyalkyl (meth)acrylates, the removal of contamination which is not soluble in water or detergents (e.g. so called graffiti) by means of solvent-containing cleaners is generally not possible without impairing the optical properties (clouding, crazing) or even destroying the shaped parts. Because of the unsatisfactory chemical resistance and pronounced stress-cracking sensitivity of the polyalkyl (meth)acrylates, shaped parts made therefrom are not usable wherever the action of solvents or chemicals cannot be definitely ruled out, for example in processing machines, packaging plants, pipe systems or the like.

It would be desirable to rectify this deficiency by coating the shaped parts of polyalkyl (meth)acrylates with a well-adhering material which is transparent or translucent and resistant to chemicals and stress cracking. The coating should here be carried out in an economical manner by the processes customary for thermoplastic processing, such as multicomponent injection molding, coextrusion, pressing, etc. To date, multilayer composites of this type are not known.

SUMMARY OF THE INVENTION

It is accordingly an object of the present invention to provide multilayer composites comprising a polyalkyl (meth)acrylate and a chemical-resistant and stress-cracking-resistant, thermoplastically processable material adhering strongly thereto.

This object is achieved by thermoplastic multilayer composites comprising (I) at least one layer of polyamide and (II) at least one layer of polyalkyl (meth)acrylate, bonded via (III) at least one coupling agent interdisposed between said layers I and II such that layers I and II adhere to one another.

DETAILED DESCRIPTION OF THE INVENTION

Layer I

Suitable polyamides useful for the layer(s) I include all conventional polyamides. Examples of suitable polyamides include:

aliphatic homopolyamides such as PA 46, PA 66, PA 6, PA 6127 PA 810, PA 1010, PA 1012, PA 11, PA 1212 or PA 12 (the naming of the polyamides corresponds to the international standard, with the first digit(s) indicating the number of carbon atoms in the starting diamine and the last digit(s) indicating the number of carbon atoms in the dicarboxylic acid. If only one number is given, this means that the starting material was a $\alpha,\omega$-aminocarboxylic acid or the lactam derived therefrom—H. Domininghaus, Die Kunststoffe und ihre Eigenschaften, page 272, VDI-Verlag (1976)).

copolyamides based on the monomers used for the above-mentioned homopolyamides, where the co-acids used can be an acid such as, for example, isophthalic acid, terephthalic acid or cyclohexane-1,4-dicarboxylic acid and/or the co-diamines used can be diamines such as, for example, branched or unbranched aliphatic diamines having from 6 to 12 carbon atoms such as, for example, 1,6-hexamethylenediamine, 2,2,4- or 2,4,4-trimethylhexamethylenediamine; cycloaliphatic diamines such as, for example, 4,4'-diaminodicyclohexylmethane, 3,3'-dimethyl-4,4'-diaminodicyclohexylmethane; isophoronediamine or aromatic diamines such as m- or p-xylylenediamine and aliphatic, cycloaliphatic or aromatic dicarboxylic acids having from 6 to 12 carbon atoms.

mixed aliphatic/aromatic polycondensates as are described, for example, in U.S. Pat. Nos. 2,071,250; 2,071,251; 2,130,523; 2,130,948; 2,241,322; 2,312, 966; 2,512,606; 3,393,210 or in Kirk-Othmer, Encyclopedia of Chemical Technology, 3rd Edition, Vol. 18, Wiley & Sons (1982), pp. 328 and 435; each incorporated herein by reference.

poly(ether ester amides) or poly(ether amides) as are described, for example, in DE-A 27 12 987, DE-A 25 23 991 or DE-A 30 06 961; each incorporated herein by reference.

transparent polyamides or copolyamides which are built up of branched or unbranched aliphatic diamines having from 6 to 12 carbon atoms such as, for example, 1,6-hexamethylenediamine, 2,2,4- or 2,4,4-trimethylhexamethylenediamine; cycloaliphatic diamines such as, for example, 4,4'-diaminodicyclohexylmethane, 3,3'-dimethyl-4,4'-diaminodicyclohexylmethane; isophoronediamine or aromatic diamines such as m- or p-xylylenediamine and aliphatic, cycloaliphatic or aromatic dicarboxylic acids having from 6 to 12 carbon atoms. Such polyamides are described, for example, in the following patents: U.S. Pat. No. 2,742,496; CH-B-480 381, CH-B-679 861, DE-A-22 25 938, DE-A-26 42 244, DE-A-27 43 515, DE-A-29 36 759, DE-A-27 32 928, EP-A-0 053 876, EP-A-0 271 308 and EP-A-0 313 436; each incorporated herein by reference.

For the purposes of the present invention, preference is given to using transparent polyamides whose light transmittance in the wavelength range of visible light is, for the applied layer thickness, more than 85% and preferably more than 90% (measured by UV/VIS spectroscopy). Both amorphous and crystalline polyamides are suitable for this purpose. While amorphous polyamides are naturally transparent, in the case of crystalline polyamides transparency can be obtained by known methods, for example by addition of another, e.g. amorphous, polyamide.

Preferred polyamides which may be mentioned are, in particular, the amorphous polyamide of terephthalic acid and the isomer mixture of 2,2,4- and 2,4,4-trimethylhexamethylenediamine, the polyamide of isophthalic acid and 1,6-hexamethylenediamine, the polyamide of a mixture of terephthalic acid/isophthalic acid and 1,6-hexamethylenediamine, the copolyamide of isophthalic acid, 3,3'-dimethyl-4,4'-diaminodicyclohexylmethane and laurolactam and also the polyamide of 1,12-dodecanedioic acid and 4,4'-diaminodicyclohexylmethane.

A particular preference is given to using the polyamide of 1,12-dodecanedioic acid and 4,4'-diaminodicyclohexylmethane. This polyamide is described in the Patent Application DE-A 43 10 970.

The relative solution viscosity $\eta_{rel}$ of the polyamide used is generally in the range from about 1.4 to about 2.2 and preferably in the range from about 1.65 to about 1.95 (measured on a 0.5% strength by weight solution in m-cresol at 25° C. in accordance with DIN 53 727/ISO 307).

The polyamides used according to the invention can additionally contain stabilizers, processing aids, customary impact modifiers, plasticizers and also other conventional additives in the customary amounts.

Layer II

The layer II is, in particular, built up of polyalkyl (meth) acrylates having from 1 to 6 carbon atoms in the carbon chain of the alkyl radical, with the methyl group being preferred as alkyl group. The polyalkyl (meth) acrylates usually have a melt flow index of from 0.5 to 30 g/10 min, preferably from 0.8 to 15 g/10 min, measured at 230° C. under a load of 3.8 kg.

Examples which may be mentioned are, inter alia, polymethyl methacrylate and polybutyl methacrylate.

However, it is also possible to use copolymers of the polyalkyl (meth)acrylates. Up to 50% by weight, preferably up to 30% by weight, of the alkyl (meth)acrylate can be replaced by other monomers such as, for example, (meth) acrylic acid, styrene, maleic anhydride or the like. Examples which may be mentioned are: copolymers of methyl (meth) acrylate containing a proportion of <30% by weight, preferably from 12 to 18% by weight, of styrene and of <20% by weight, preferably from 6 to 12% by weight, of maleic anhydride.

The polyalkyl (meth)acrylate of the layer II can additionally contain stabilizers, processing aids, customary impact modifiers and also other conventional additives in the customary amounts.

Layer III

As coupling agents (layer III), use is made of molding compositions which give adhesion to the adjacent layers in the production of the multilayer composites, in particular in coextrusion. It is desirable that at the same time they do not influence the transparency of the multilayer composite or influence it only to a negligible extent. A series of such polymers which are suitable as coupling agents are commercially available. For example, use can be made of copolymers which contain at least the following basic building blocks:

a) from 14 to 96% by weight, preferably from 14 to 85% by weight, of

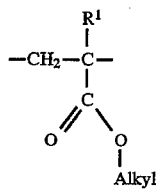

b) from 0.2 to 60% by weight, preferably from 1 to 30% by weight, particularly preferably from 3 to 15% by weight, of

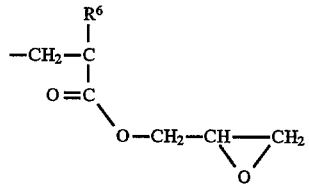

where alkyl is methyl, ethyl, propyl, butyl, pentyl or hexyl and $R^1$ and $R^6$ are each, independently, H or ($C_nH_{2n+1}$), where n is from 1 to 6, Preference is given to those basic building blocks in which $R^1$ and $R^6$ are hydrogen or methyl and alkyl is preferably methyl.

An example of a suitable coupling agent is a copolymer based on ethylene, glycidyl methacrylate and methyl acrylate, for example containing 6% by weight of glycidyl methacrylate and 30% by weight of methylacrylate.

Furthermore, the coupling agents used Jan be acrylate copolymers containing at least the following basic building blocks:

i) from 14 to 96% by weight, preferably from 14 to 85% by weight, particularly preferably from 35 to 70% by weight, of

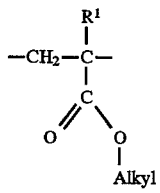

ii) from 0 to 75% by weight, preferably from 10 to 75% by weight, particularly preferably from 20 to 40% by weight, of

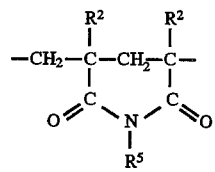

iii) from 0 to 15% by weight of

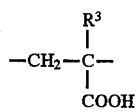

iv) from 0.2 to 25% by weight, preferably from 2 to 20% by weight, particularly preferably from 6 to 12% by weight, of

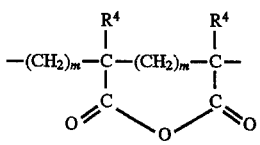

where
m is 0 or 1;
alkyl is methyl, ethyl, propyl, butyl, pentyl or hexyl; and
$R^1$ to $R^5$ are each, indepently, H or $(C_nH_{2n+1})$, where n is from 1 to 6.

Preference is given to those basic building blocks in which $R^1$ to $R^5$ are hydrogen or methyl, alkyl is methyl and m is 1.

Suitable coupling agents from this series are, for example, copolymers based on ethylene and methyl acrylate which have been modified with maleic anhydride.

The acrylate copolymers which are preferably used, in which from 10 to 75% by weight of the basic building block (ii) are present and $R^1$ to $R^5$ are methyl, are also described as polymethacrylimides, sometimes also as polyglutarimides. These compounds are polyalkyl (meth)acrylates in which two adjacent carboxylate groups have been reacted to form a cyclic acid imide. The imide formation is preferably carried out using ammonia or primary amines such as, for example, methylamine. Both the products and their preparation are known (Hans R. Kricheldorf, Handbook of Polymer Synthesis, Part A, Verlag Marcel Dekker Inc. New York—Basel—Hong Kong, p. 223 ff; H. G. Elias, Makromolecüle, Hüthig und Wepf Verlag Basel—Heidelberg—New York; U.S. Pat. Nos. 2,146,209; 4,246,374).

To increase the low-temperature impact toughness, the acrylate copolymers can also contain appropriate modifiers. Examples which may be mentioned are core/shell polymers having a polybutyl acrylate core and a shell of polymethyl methacrylate and/or polymethacrylimide. Apart from the examples mentioned, further modifiers are possible.

The molding compositions for the layers I, II and III can have added to them customary auxiliaries and additives such as, for example, flame retardants, stabilizers, plasticizers, processing aids, viscosity improvers, pigments or the like. The specified agents are to be added in such an amount that the desired properties are not seriously affected.

The invention also includes thermoplastic multilayer composites in which the layer II and the layer III are identical. In this case the polyalkyl(meth)acrylate is a copolymer as defined above, having a composition which by itself results in adhesive bonding to the polyamide layer.

The thermoplastic multilayer composites can be manufactured in one or more stages.

In the single-stage injection-molding process, the various melts are brought together in a mould and the molding is allowed to cool (multicomponent injection molding).

In the single-stage extrusion process, the various melts are coextruded in a customary manner. In this way it is possible to make the known shaped parts such as, for example, pipes, sheets, U profiles and other profiles.

The coextrusion process can be supplemented by a subsequent blow-molding process.

In the multistage processes, a shaped part is first produced from one of the components and is then bonded to the remaining components by pressing, injection molding or extruding.

The table below shows examples of thermoplastic multilayer composites having an arrangement of layers according to the invention.

Of course, other arrangements of layers are possible in addition to these examples.

TABLE 1

Arrangement of layers in thermoplastic multilayer composites of the invention

| Layer arrangement No. | Order |
| --- | --- |
| 1 | Layer I |
|   | Layer II |
|   | Layer III |
| 2 | Layer I |
|   | Layer III |
|   | Layer II |
|   | Layer III |
| 3 | Layer I |
|   | Layer III |
|   | Layer II |
|   | Layer III |
|   | Layer I |
| 4 | Layer I |
|   | Layer II/III |
|   | (the bonding agent is here identical to the polyalkyl (meth)acrylate) |
| 5 | Layer I |
|   | Layer II/III |
|   | Layer I |
|   | (the bonding agent is here identical to the polyalkyl (meth)acrylate) |

By means of the invention, there are obtained multilayer shaped parts which, compared with poly(meth)acrylate, have a significantly improved chemical resistance and, in particular, an improved resistance to aromatic and partially aromatic solvents.

Having generally described this invention, a further understanding can be obtained by reference to certain specific examples which are provided herein for purposes of illustration only and are not intended to be limiting unless otherwise specified.

EXAMPLES

The results given in the examples were determined by means of the following measurement methods.

The melt flow index of the polymethacrylimides used is determined at 230° C. and under a load of 3.8 kg (DIN 53 735).

The melt flow index of the polyalkyl (meth)acrylates is determined at 230° C. and under a load of 3.8 kg (DIN 53 735).

The solution viscosity (rel. viscosity $\eta_{rel}$) of the polyamides is determined using a 0.5% strength by weight m-cresol solution at 25° C. in accordance with DIN 53 727/ISO 307.

The mechanical separability at the interface is tested using a metal wedge (cutting angle 5 degrees; loading: 2.5 kg), with an attempt being made to separate the material interface to be tested. If the separation occurs at the boundary between the components, the adhesion is poor. If, on the other hand, the separation occurs completely or partially within one of the two components, good adhesion is present.

Examples denoted by letters are not according to the invention.

Polyamides used (Layer I)
PA 1: Polyamide of terephthalic acid and a mixture of 2,2,4- and 2,4,4-trimethylhexamethylenediamine $\eta_{rel}$:1.65).

PA 2: Polyamide of isophthalic acid and 1,6-hexamethylenediamine ($\eta_{rel}$:1.55).

PA 3: Polyamide of terephthalic acid/isophthalic acid (70/30) and 1,6-hexamethylenediamine ($\eta_{rel}$:1.55).

PA 4: Polyamide of 4,4'-diaminodicyclohexylmethane and 1,12-dodecanedioic acid ($\eta_{rel}$:1.85).

Polyalkyl (meth)acrylates used (Layer II)

PMMA 1: Polymethyl methacrylate (melt flow index: 3 g/10 min; Plexiglas 8N—Röhm GmbH).

PMMA 2: Polymethyl methacrylate (melt flow index: 25 g/10 min; Plexiglas 5N—Röhm GmbH).

Coupling agents H 1 to H 3 used: Polymethyl methacrylimides (Layer III)

The polymethyl methacrylimides are built up of the building blocks denoted above by i) to iv), with alkyl and $R^1$ to $R^5$ being methyl in each case and m being 1.

Composition of the polymethyl methacrylates and polymethacrylimides used:

|  | H 1*) | H 2 | H 3 |
|---|---|---|---|
| % by weight i) | 100 | 14 | 57 |
| % by weight ii) | 0 | 86 | 30 |
| % by weight iii) | 0 | 0 | 4 |
| % by weight iv) | 0 | 0 | 9 |
| Melt flow index (g/10 min) | 0.8 | 0.4 | 0.4 |

*) H 1 = PMMA 1

Coupling agent H 4 used (Layer III)

Copolymer of ethylene (64% by weight), glycidyl methacrylate (6% by weight) and methyl acrylate (30% by weight); melt flow index (190°/2.16 kg)=9.

Production of the multilayer composites

Two-layer and three-layer films and also five-layer pressed sheets were produced.

The two-layer and three-layer films were produced in a laboratory coextrusion facility whose feed extruders have a screw diameter of 25 mm or 30 mm. The barrel temperatures were 280° C. (PA 1, PA 2, PA 3, PA 4), 250° C. (H 2, H 3) and 230° C. (H 1, PMMA 1, PMMA 2). The layer thicknesses were 0.5 mm in each case.

The multilayer pressed sheets were produced in a laboratory press at 275° C. using a pressing time of 5 min.

The results are shown in Tables 2 and 3.

TABLE 2

| | Coextruded films | | | | |
|---|---|---|---|---|---|
| | Layer (adjacent layers are in direct contact) | | | Mechanically separable at the interface after storage at | |
| No. | I. | III. | II. | 23° C., 20 d | 75° C., 100 h |
| A | PA 1 |  | PMMA 1 | yes | yes |
| B | PA 2 |  | PMMA 2 | yes | yes |
| C | PA 1 | H1 | PMMA 1 | yes: I of III | yes: I of III |
| D | PA 2 | H 2 | PMMA 2 | yes: I of III | yes: I of III |
| 1 | PA 1 | H 3 | PMMA 1 | no | no |
| 2 | PA 2 | H 3 | PMMA 2 | no | no |
| 3 | PA 3 | H 3 | PMMA 1 | no | no |
| 4 | PA 4 | H 3 | PMMA 2 | no | no |
| 5 | PA 1 | H 4 | PMMA 1 | no | no |

TABLE 3

| | | Pressed sheets | |
|---|---|---|---|
| No. | Build-up of layers | Mechanically separable at the interface after storage for 20 d at 23° C. | Stress cracks after treatment with drops of toluene at 23° C. |
| E | 4.0 mm PMMA 1 |  | yes |
| 6 | 0.5 mm PA 1<br>0.5 mm H 3<br>2.0 mm PMMA 1<br>0.5 mm H 3<br>0.5 mm PA 1 | no | no |
| 7 | 0.5 mm PA 1<br>0.5 mm H 4<br>2.0 mm PMMA 1<br>0.5 mm H 4<br>0.5 mm PA 1 | no | no |

What is claimed as new and desired to be secured by Letters Patent of the United States is:

1. A thermoplastic multilayer composite comprising (I) at least one layer of polyamide and (II) at least one layer consisting essentially of polyalkyl (meth)acrylate or a copolymer of alkyl (meth)acrylate and up to 50% by weight of other monomers, bonded via (III) at least one polymeric coupling agent interdisposed between said layers I and II such that layers I and II adhere to one another.

2. The thermoplastic multilayer composite of claim 1, wherein said coupling agent of layer III comprises:

i) from 14 to 96% by weight of

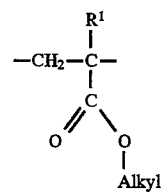

ii) from 0 to 75% by weight of

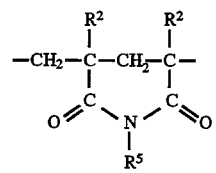

iii) from 0 to 15% by weight of

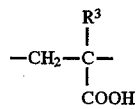

iv) from 0.2 to 25% by weight of

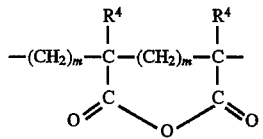

where m is 0 or 1, alkyl is methyl, ethyl, propyl, butyl, pentyl or hexyl, and $R^1$ to $R^5$ are, independently, H or $(C_nH_{2n+1})$, where n is 1 to 6.

3. The thermoplastic multilayer composite of claim 2, wherein said coupling agent of layer III comprises:

i) from 14 to 85% by weight of

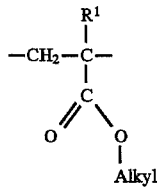

ii) from 10 to 75% by weight of

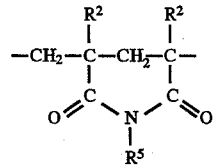

iii) from 0 to 15% by weight of

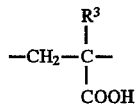

iv) from 2 to 20% by weight of

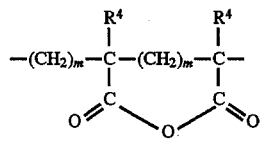

where m is 0 or 1;

alkyl is methyl, ethyl, propyl, butyl, pentyl or hexyl; and $R^1$ to $R^5$ are each, indepently, H or $(C_nH_{2n+1})$, where n is from 1 to 6.

4. The thermoplastic multilayer composite of claim 3, wherein said layer III comprises (i) from 35 to 70% by weight of

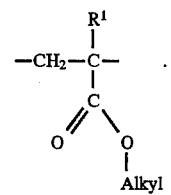

5. The thermoplastic multilayer composite according to claim 3, wherein said layer III comprises (ii) from 20 to 40% by weight of

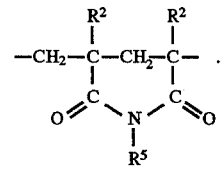

6. The thermoplastic multilayer composite of claim 3, wherein said layer III comprises (iv) from 6 to 12% by weight of

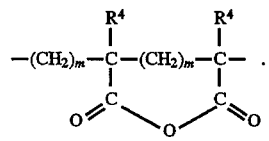

7. The thermoplastic multilayer composite of claim 2, wherein said alkyl and also $R^1$ to $R^5$ are in each case hydrogen or a methyl group and m is equal to 1.

8. The thermoplastic multilayer composite of claim 2, wherein said coupling agent of layer III comprises a copolymer of ethylene, methyl acrylate and maleic anhydride.

9. The thermoplastic multilayer composite of claim 1, wherein coupling agent of said layer III comprises:

a) from 14 to 96% by weight of

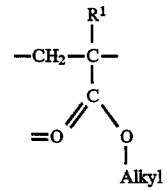

b) from 0.2 to 60% by weight of

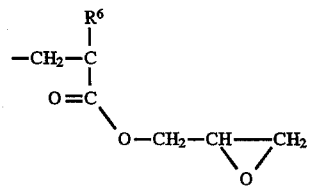

where alkyl is methyl, ethyl, propyl, butyl, pentyl or hexyl and $R^1$ and $R^6$ are, independently, H or $(C_nH_{2n+1})$, where n is 1 to 6.

10. The thermoplastic multilayer composite of claim 9, wherein said coupling agent of said layer III comprises a copolymer of ethylene, glycidyl methacrylate and methyl acrylate.

11. The thermoplastic multilayer composite of claim 9, wherein said layer II consists essentially of a molding composition based on polymethyl methacrylate or polybutyl methacrylate.

12. The thermoplastic multilayer composite of claim 11, wherein said molding composition for said layer II consists essentially of copolymers based on methyl methacrylate.

13. The thermoplastic multilayer composite of claim 1, wherein said polyamide of said layer I is transparent.

14. The thermoplastic multilayer composite of claim 13, wherein the light transmittance of said transparent polyamide in the wavelength range of visible light is, at the layer thickness applied, more than 85%.

15. The thermoplastic multilayer composite of claim 14, wherein said light transmittance of said transparent polyamide in the wavelength range of visible light is, at the layer thickness applied, more than 90%.

16. The thermoplastic multilayer composite of claim 13, wherein said polyamide of said layer I is derived from 1,12-dodecanedioic acid and 4,4'-diaminodicyclohexylmethane.

17. The thermoplastic multilayer composite of claim 1, which contains more than one of said layers I, more than one of said layers II and/or more than one of said layers III, with the layers I and II being in each case bonded to one another via a layer III lying in between.

18. The thermoplastic multilayer composite of claim 17, comprising the following layers in the following order:

layer I layer III layer II layer III layer I.

* * * * *